United States Patent
Lee et al.

(10) Patent No.: US 7,369,565 B2
(45) Date of Patent: May 6, 2008

(54) WIRELESS COMMUNICATION SYSTEM AND METHOD USING THE SAME

(75) Inventors: Tae-jin Lee, Gyunggi-do (KR); Kyun-hyon Tchah, Seoul (KR); Ki-soo Chang, Gyunggi-do (KR); Oh-seok Kwon, Seoul (KR); Yang-ick Joo, Seoul (KR); Jong-soo Oh, Seoul (KR); Yong-suk Kim, Daejeon (KR); Doo-seop Eom, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 963 days.

(21) Appl. No.: 10/620,437

(22) Filed: Jul. 17, 2003

(65) Prior Publication Data

US 2004/0085981 A1 May 6, 2004

(30) Foreign Application Priority Data

Nov. 5, 2002 (KR) .................. 10-2002-0068137

(51) Int. Cl.
*H04L 12/28* (2006.01)
(52) U.S. Cl. .................. 370/412
(58) Field of Classification Search .............. None
See application file for complete search history.

(56) References Cited

U.S. PATENT DOCUMENTS

| | | | | |
|---|---|---|---|---|
| 6,683,886 B1* | 1/2004 | van der Tuijn et al. | .... | 370/458 |
| 6,920,171 B2* | 7/2005 | Souissi et al. | ...... | 375/133 |
| 7,054,936 B2* | 5/2006 | El Batt et al. | ...... | 709/226 |
| 7,136,361 B2* | 11/2006 | Benveniste | ...... | 370/310.2 |
| 2002/0167961 A1* | 11/2002 | Haartsen | ...... | 370/444 |
| 2003/0108005 A1* | 6/2003 | Agrawal et al. | ...... | 370/329 |
| 2003/0145095 A1* | 7/2003 | Liu et al. | ...... | 709/230 |

(Continued)

FOREIGN PATENT DOCUMENTS

EP          1 221 790 A2      7/2002

OTHER PUBLICATIONS

Jong Soo Oh, et al, "Differentiated Fairness Guaranteeing Scheduling Polices for Bluetooth" IEEE, pp. 923-926, 2002.

(Continued)

*Primary Examiner*—Wing Chan
*Assistant Examiner*—Anthony Sol
(74) *Attorney, Agent, or Firm*—Sughrue Mion, PLLC

(57) ABSTRACT

A wireless communication system has a queue information search unit for searching a queue-status information provided in a packet unit, a communication priority decision unit for deciding communication priority of external devices based on the queue-status information, giving a higher priority to the external device having a greater number of packets in queues, a communication initiation unit for initiating a communication with the external devices according to the communication priority, a counter for counting the number of times that the communication is initiated for each of the external devices, and a comparator for comparing a counter value of a first external device that corresponds to a transmitted data with a counter value of a second external device that has a maximum counter value. Accordingly, when the wireless communication device transmits and receives data with respect to the plural wireless communication devices, both high throughput and high fairness can be guaranteed.

14 Claims, 7 Drawing Sheets

U.S. PATENT DOCUMENTS

2003/0223365 A1* 12/2003 Kowalski ................. 370/230.1
2004/0224637 A1* 11/2004 Silva et al. ................. 455/63.4
2005/0174973 A1*  8/2005 Kandala et al. ............ 370/338
2005/0239474 A9* 10/2005 Liang .......................... 455/454

OTHER PUBLICATIONS

Chinese Office Action in corresponding Chinese Application CH 03136681.3 and English language version of portion thereof.

M. Kalia, et al. "MAC scheduling and SAR policies for Bluetooth: a master driven TDD pico-cellular wireless system" Mobile Multimedia Communications, 1999. IEEE International Workshop on San Diego, CA, USA Nov. 15-17, 1999, Piscataway, NJ, USA, IEEE, US Nov. 15, 1999, pp. 384-388, XP010370692 ISBN: 0-7803-5904-6.

Oh et al., "Differentiated Fairness Guaranteeing Scheduling Policies for Bluetooth," *2002 IEEE 56th Vehicular Technology Conference Proceedings*, Sep. 24-28, 2002 (including 2 pages of cover sheets titled "2002 IEEE 54th Vehicular Technology Conference" and 1 page of session proceedings).

Chinese Office Action in corresponding Chinese Application CH 03136681.3 and English language version of portion thereof., 2002.

* cited by examiner

WIRELESS COMMUNICATION SYSTEM AND METHOD USING THE SAME

BACKGROUND OF THE INVENTION

1. Field of the Invention

The present invention relates to a remote wireless communication system such as a Bluetooth system and a communication method thereof, and more particularly, to a wireless communication system capable of guaranteeing both high throughput and fairness of wireless communication devices during data transmission and reception between one wireless communication device and plural wireless communication devices, and a communication method thereof.

2. Description of the Prior Art

Bluetooth is a code name of a wireless data communication technology that is applied in the fields of electronics and telecommunications, networking, computing and consumables. The Bluetooth technology can replace various cables that otherwise would be required to be connected between the communication devices for each wireless communication connection, and enables wireless communication within short distances. For example, the Bluetooth technology applied in a mobile telephone and a laptop computer enables connection of the mobile phone and the laptop computer without requiring cables. Almost all digital devices, including a printer, a personal digital assistant, a desktop PC, a facsimile machine, a keyboard and a joystick, can be a part of the Bluetooth system.

Generally, Bluetooth operates with a maximum data transmission speed of 1 Mbps and at a maximum transmission distance of 10 m. As '1 Mbps' is a data transmission speed within the industrial scientific medical (ISM) frequency band of 2.4 GHz which can be used by a user without a license, the transmission speed can be easily achievable at low cost. The maximum transmission distance is also set as 10 m in consideration of the fact that 10 m is sufficient a distance in the office for a mobile device carried by a user and a PC on the desk to communicate.

Having been designed to operate in a radio frequency environment that is laden with noises, Bluetooth enables stable data transmission and reception even at a noisy wireless frequency by using frequency hopping with the hopping rate of 1600 hops per second. The frequency hopping is often called as a frequency hopping spread spectrum (FHSS) scheme. In the FHSS scheme, a given frequency band is segmented into lots of hopping channels, so that when a firstly modulated signal (intermediate frequency) from a transmitter is converted into the radio frequency band of 2.4 GHz, the signals are appointed to different hopping channels in a predetermined order. Since signal appointing channels change at rapid speed, influences by multi-channel interference and narrow bandwidth impulse noise can be lessened. At a receiver's end, the original signals are recovered as the signals distributed to the hopping channels are connected with each other in the same order as at the transmitter's end. IEEE 802.11 uses 79 hopping channels, and each of the hopping channels is arranged at a 1 MHz interval. At least a 6 MHz interval is set between two temporally neighboring hopping channels so that inter-channel interference can be avoided when the signals are allotted with hopping over many channels. Speed of changing hopping channels (i.e., hopping rate) is also set to be more than 2.5 times per second.

In addition to one-to-one connection, the Bluetooth system also supports one-to-multi connection. As shown in the Bluetooth system of FIG. 1, there may be several piconets constructed and connected, while each piconet is characterized by the respective frequency hopping priorities. The piconet is one unit of Bluetooth system, in which more than one slave is connected to a single master. One piconet has one master, and can have up to 7 slaves. For example, FIG. 1 shows piconets A and B, piconet A having a master 10 and three slaves 13, and piconet B having a master 10 and one slave 13. The master device decides overall properties of the channels within the piconet. The Bluetooth device address (BD_ADDR) of the master determines frequency hop sequence and channel access code. In other words, the clock of the master determines a phase of hop sequence and sets timing. Also, the master controls traffic in the channels. Any digital device can be a master, and the role of a master and a slave can change after a piconet is established.

Basically, a master device and a slave device perform bi-directional communication by time division duplex (TDD) in the unit of 1 hopping slot (625 µs=1/600 sec). A plurality of piconets connected in a certain structure is called a 'scatternet'.

FIG. 2 is a view showing the communications between the master and the slave by TDD. Referring to FIG. 2, the length of each channel allotted to a time slot is 625 µs. The number of time slots is decided according to the Bluetooth clock of the piconet master. The master and slave may selectively transmit packets by the time slots. That is, while the master transmits packets only in even-numbered time slots, the slave transmits packets only in odd-numbered time slots. Packets that are transmitted either by master or slave must be realized within the 5 time slots. A 'packet' refers to the unit of data being transmitted in the piconet channel.

When more than 2 slaves access 1 master in the piconet, the master assigns temporary 3-bit addresses to the slaves for later use to distinguish the slaves when they are activated. In other words, all the packets being exchanged between the master and the slaves carry AM_ADDR. The AM_ADDR is represented as the member address, which identifies active members participated in the piconet. Not only in the packet transmitted from the master to the slave, the AM_ADDR is also used in the packet transmitted from the slave to the master. The AM_ADDR is given up if it is assigned when the slave is not connected to the master, or when the slave is in a park mode. Then a new AM_ADDR is required to be assigned when the slave is re-connected to the master. One piconet has no more than one master and seven slaves because the AM_ADDR that the master assigns to the active slaves is set with 3-bits in length. In other words, since the address "000" among maximum 8 addresses is used for broadcasting from the master to the slave, the rest of the addresses, i.e., the 7 addresses from "001" to "111" can be used.

When one master transmits and receives data with more than two slaves in the piconet, the master segments time slot at uniform intervals and allocates the respective time slots to the slaves, and transmits and receives data through the allocated time slots. Accordingly, data collision is avoided.

Usually, the master transmits and receives data with the respective slaves wirelessly using the round-robin polling.

FIG. 3 is a view showing data transmission/reception by the round-robin polling in the case where one master communicates with 3 slaves. Referring to FIG. 3, the round-robin polling only allows the slave polled by the master to send the data. In other words, the master can transmit data in the even-numbered slots, while the slaves, which are polled by the master, can transmit data in the adjacent odd-numbered slots. The rest slaves, i.e., unpolled slaves, may not transmit the data in the corresponding slots. In this case, the master sequentially polls slave 1, slave 2 and slave 3, by which the respective master-slave pairs transmit and receive data in the transmission rate that is one third of the overall transmission rate.

According to the round-robin polling, there is no problem when the master-slave pairs respectively have the same transmission rate. However, if the transmission rate of each master-slave pair is not identical, system efficiency degrades. In other words, since each allotted slot is used for the exchange of POLL-NULL packets regardless of whether one master-slave pair has no, or less data transmission than the other master-slave pairs, slot wastage occurs, and as a result, overall performance of the system degrades.

SUMMARY OF THE INVENTION

Accordingly, it is an object of the present invention to provide a wireless communication system capable of improving data transmission efficiency when one wireless communication device transmits and receives data with an external device, by varying a communication priority of the communication devices in accordance with the queue-state of the data being transmitted and received.

In order to accomplish the above object, a wireless communication system according to the present invention includes a queue information search unit for searching a queue-status information provided to a data in a packet unit, a communication priority decision unit for deciding a communication priority of a plurality of external devices based on the queue-status information as searched, giving a higher priority to the external device having a greater number of packets in queues, a communication initialization unit for initializing a communication with the external devices according to the communication priority as decided, a counter for counting the number of times that the communication is initiated for each of the external devices, and a comparator for comparing a counter value of a first external device that corresponds to a transmitted data with a counter value of a second external device that has a maximum counter value.

When the counter value difference between the first external device and the second external device is smaller than a predetermined threshold, the communication initiation unit initiates communication with a third external device which has a highest communication priority.

In the case that the first external device has the communication priority other than the highest priority, the counter subtracts a counter increment step size of the first external device from the counter value of the first external device. The counter increases the counter value of the third external device having the highest communication priority by as much as '1'.

When the first external device has the highest communication priority, the communication initiation unit initiates communication with the first external device. The counter increases the counter value of the first external device by as much as '1'.

When the counter value difference between the first external device and the second external device is greater than a predetermined threshold, the communication initialization unit initiates communication with the first external device. In this case, the counter adds the counter value of the first external device with the difference between a maximum counter increment step size and a counter increment step size of the first external device, the maximum counter increment step size being the greatest among the counter increment step sizes of the plural external devices.

As a result, the wireless communication system according to the present invention can have a high data transmission rate by varying communication priorities of plural participating external devices according to the queue-status of the data being transmitted and received with respect to the external devices.

The wireless communication system according to the present invention also provides a wireless communication method that includes the steps of searching a queue-status information provided in a data in a packet unit, deciding a communication priority of plural external devices based on the queue-status information as searched, giving the higher priority to the external device having a greater number of packets in queues, initiating communication with the external devices according to the communication priority as decided, counting the number of times that the communication is initiated for each of the external devices, and comparing a counter value of a first external device that corresponds to the transmitted data with a counter value of a second external device that has a maximum counter value.

BRIEF DESCRIPTION OF THE DRAWINGS

The above objects and other features of the present invention will become more apparent by describing in detail a preferred embodiment thereof with reference to the attached drawings, in which.

DETAILED DESCRIPTION OF THE PREFERRED EMBODIMENT

Hereinafter, the present invention will be described in detail with reference to the accompanying drawings.

Figure 1:
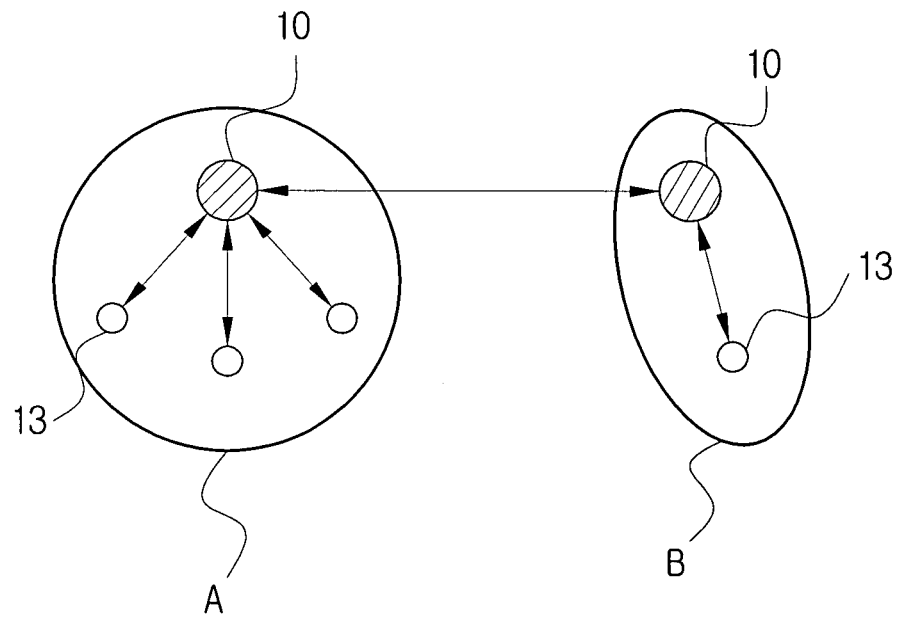
FIG. 1 is a view showing a piconet and a scatternet of a Bluetooth system.
Figure 2:
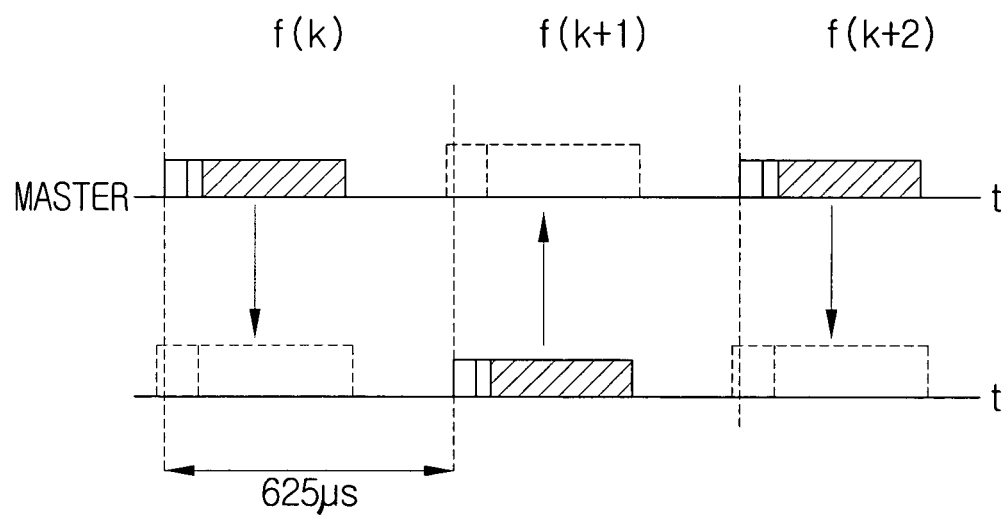
FIG. 2 is a view showing the communications between the master and the slave by time division duplex (TDD)
Figure 3:
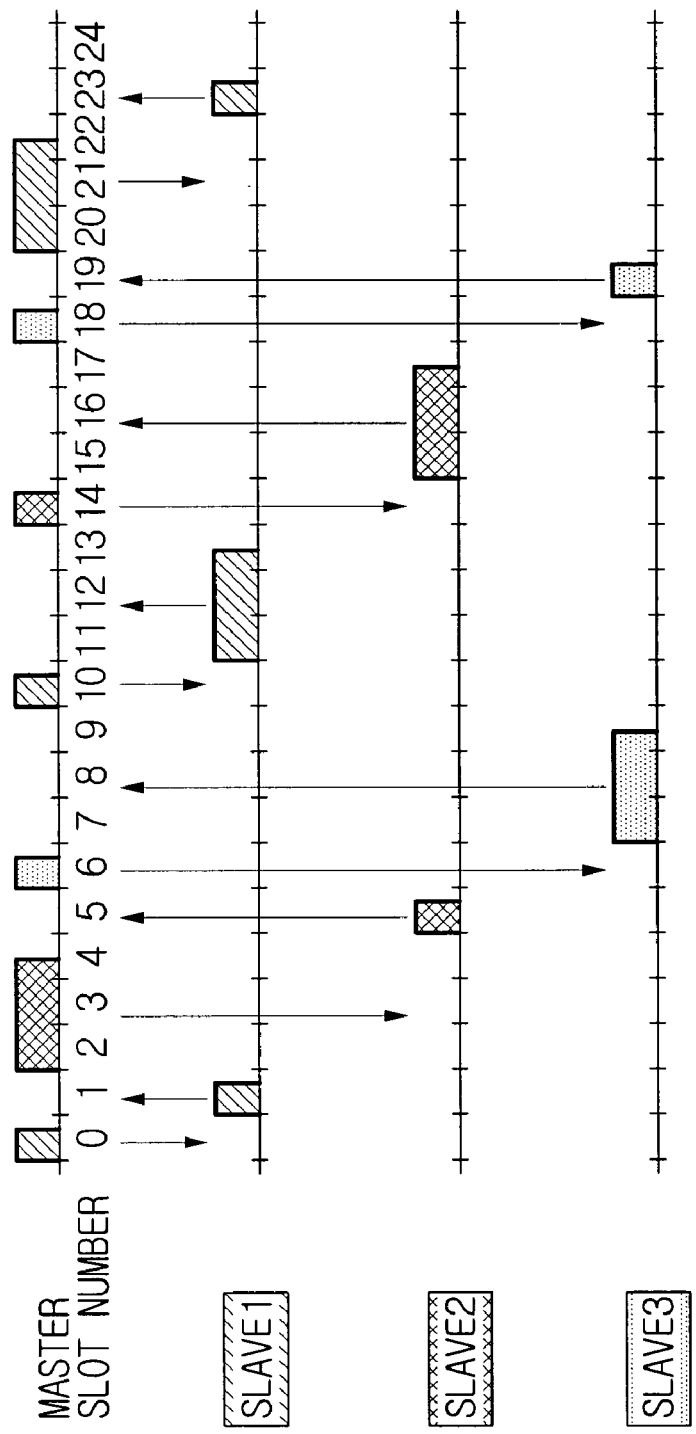
FIG. 3 is a view showing data transmission and reception by the round-robin polling in the case where one master communicates with three slaves.
Figure 4:
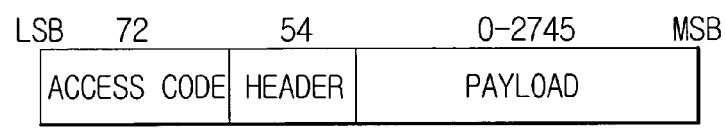
FIG. 4 is a view showing a standard packet.

FIG. 4 shows a standard packet. In a piconet, data is transmitted between the master and the slave in the packet unit. Referring to FIG. 4, each packet consists of three parts, i.e., an access code, a header and a payload. Besides this standard format, there may be a packet of access code only, or of access code and header.

Packet begins with access code. If header follows the access code, the access code is 72 bits in length, and if not, the access code is 68 bits in length. The access code is for distinguishing the packets being exchanged in the channels of the piconet.

Header contains a link controller (LC) informed therein, and consists of 6 fields, i.e., active member address (AM_ADDR), TYPE, FLOW, automatic repeat request number (ARQN), sequential numbering scheme (SEQN) and header-error-check (HEC).

AM_ADDR distinguishes active members participating in the piconet when pluralities of slaves are connected to one master. TYPE decides which way the packet is to be transmitted between the synchronous connection oriented (SCO) link and the asynchronous connectionless link (ACL). TYPE may determine whether it is the SCO packet, or the ACL packet that is received. FLOW is used to control packet flow in the ACL. ARQN is used to notify the source about the successful transmission of the payload. If the reception is made successfully, an acknowledge ACK (ARQN=1) is returned, and if not, NAK (NRQN=0) is returned. SEQN provides successive numbering of the data packet stream. HEC inspects completeness of the header.

The payload is divided into a synchronous voice field and an asynchronous data field. ACL packet has only the data field, while the SCO packet has only the voice field. A payload header is provided to the payload. Payload header has information about the length of the payload.

Figure 5:
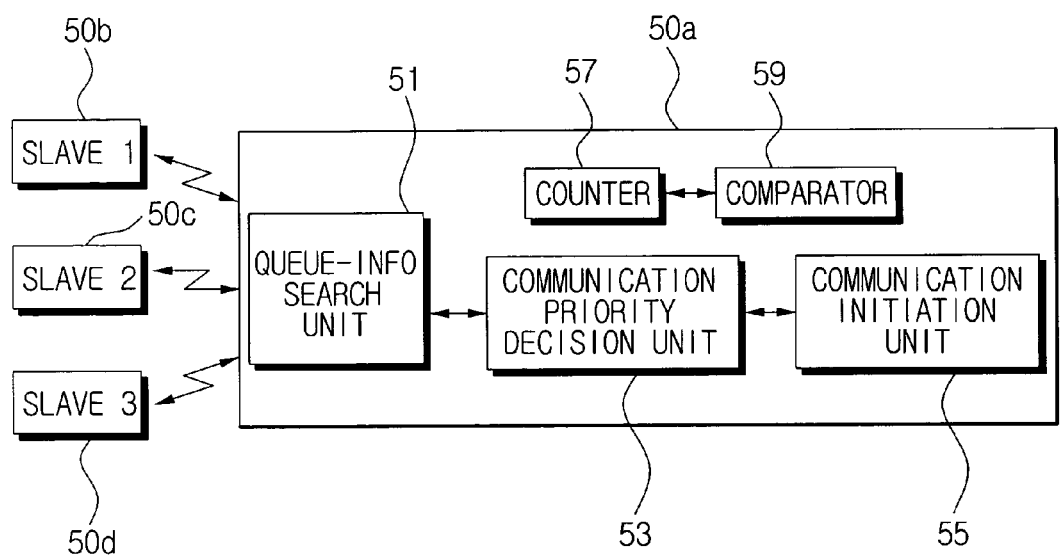
FIG. 5 is a schematic view of a wireless communication system having a piconet according to the present invention.

FIG. 5 is a schematic view of a wireless communication system having a piconet according to the present invention. Each of the Bluetooth systems 50*a*, 50*b*, 50*c*, 50*d* includes a queue-information search unit 51, a communication priority decision unit 53, a communication initiation unit 55, a counter 57 and a comparator 59.

The queue-information search unit 51 of the Bluetooth system 50*a* operating as a master searches queue-status information provided in the data when the data are transmitted and received in the packet unit with respect to the other Bluetooth systems 50*b*, 50*c*, 50*d* operating as a slave. The queue-status information is exchanged using a reserved bit of the payload header of the packet. The 'queue' refers to a waiting line for processing at a buffering unit, and the 'queue-status information' refers to the information about the status of the waiting line, i.e., about the length of the data that are waiting in line.

The communication priority decision unit 53 decides communication priority of the respective slaves 50*b*, 50*c*, 50*d* based on the queue-status information received from the respective slaves 50*b*, 50*c*, 50*d*, i.e., giving higher priority to the slave having greater number of packets in queues.

The communication initiation unit 55 initiates communication according to the communication priority decided by the communication priority decision unit 53. For example, assuming that each of the first slave 50*b*, second slave 50*c*, and third slave 50*d* has one packet to communicate with the master 50*a*, and that the number of packets in queues for each of the first master-slave pair (50*a*, 50*b*), second master-slave pair (50*a*, 50*c*), and third master-slave pair (50*a*, 50*d*) is 3-1, 1-1 and 2-1, the master 50*a* initiates communication with the slaves in the order of first slave 50*b*, third slave 50*d* and second slave 50*c*.

In the case that the packets are consecutively transmitted and received between the first master-slave pair (50*a*, 50*b*), second master-slave pair (50*a*, 50*c*) and third master-slave pair (50*a*, 50*d*) in the respective communication channels with respect to the master 50*a*, the counter 57 counts the number of communications being initialed in each of the slaves 50*b*, 50*c*, 50*d*. The comparator 59, with the data transmission and reception between the master 50*a* and the slave 50*b* for example, compares the counter value of the first slave 50*b*, and the maximum counter value of the other slaves 50*c* or 50*d*.

Figure 6:
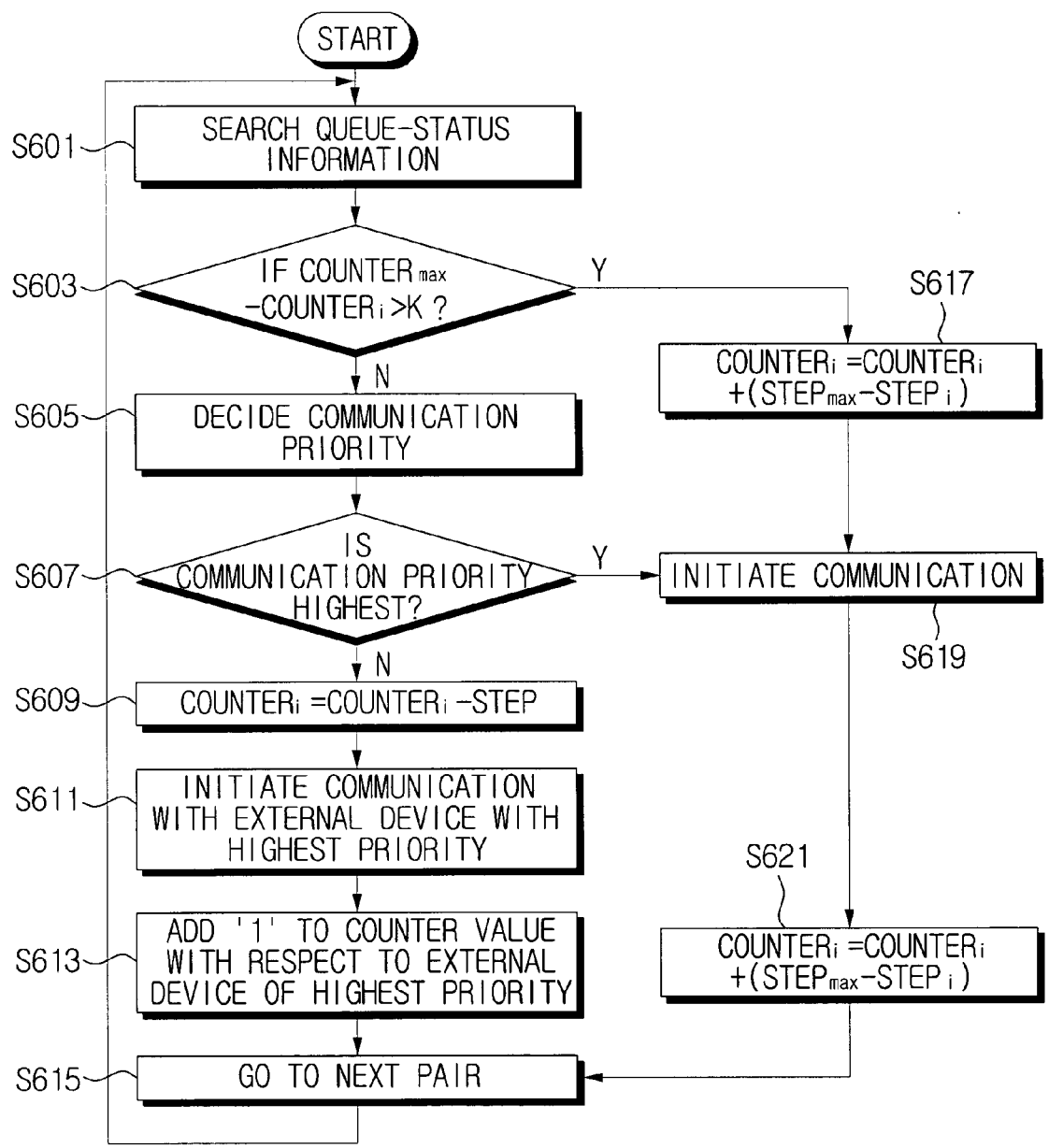
FIG. 6 is a flowchart illustrating a wireless communication method according to the present invention.
Figure 7:
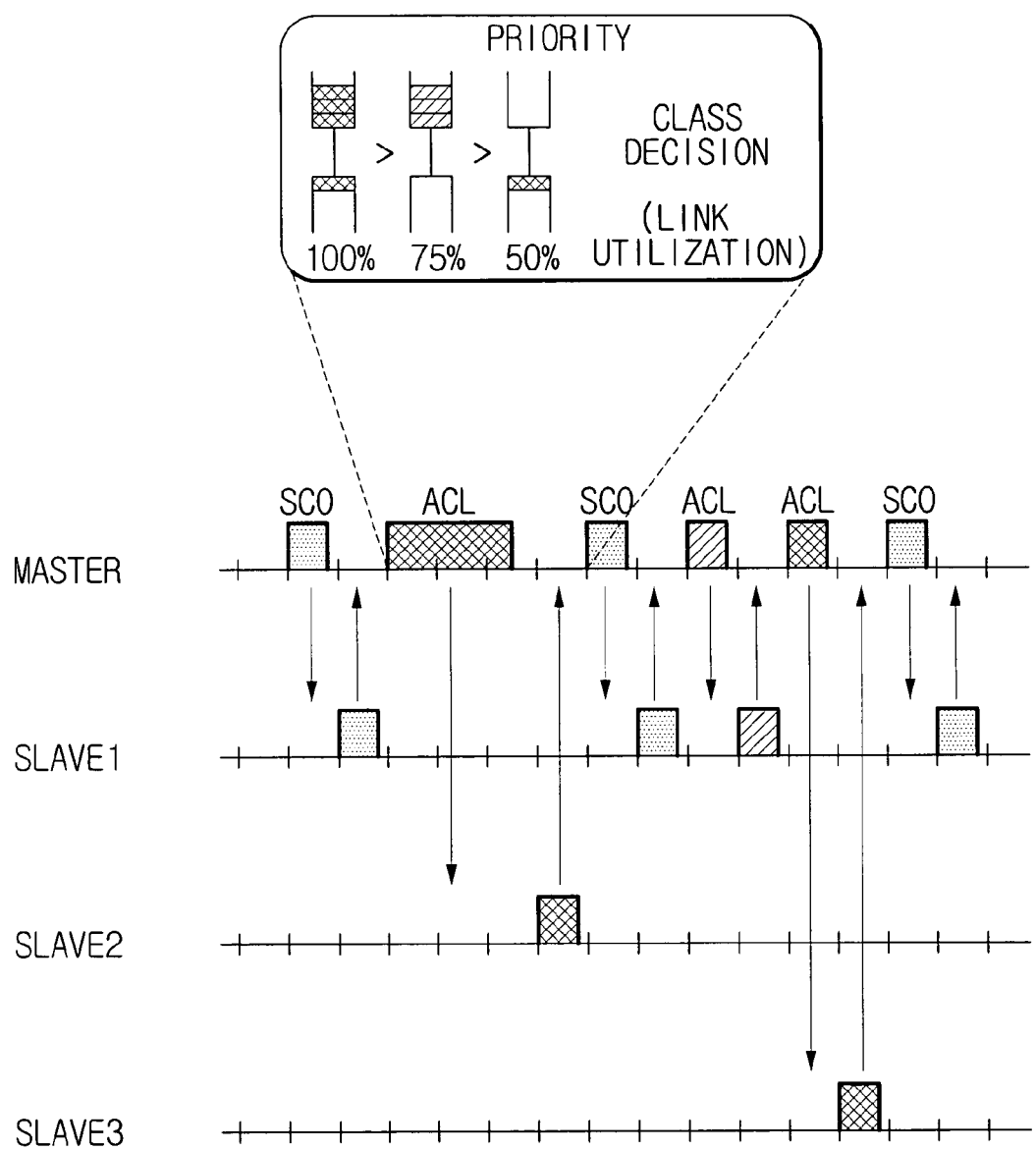
FIG. 7 is a view showing data transmission and reception by a queue-state based scheduling method of FIG. 6.

FIG. 6 is a flowchart illustrating a wireless communication method according to the present invention, and FIG. 7 is a view showing data transmission and reception according to the queue-status based scheduling method of FIG. 6. The present invention will be described in greater detail below with reference to FIGS. 6 and 7.

For a convenience in explaining the present invention, it is assumed that the master 50*a* is currently in the data transmitting and receiving activity with the first slave 50*b*, the second slave 50*c* and the third slave 50*d*, and the communication frequency between the first master-slave pair (50*a*, 50*b*), the second master-slave pair (50*a*, 50*c*) and the third master-slave pair (50*a*, 50*d*) in the packet unit is 30, 20 and 50, respectively. It is also assumed that the number of queues of the data in the packet unit being transmitted and received between the master-slave pairs 50*a*-50*b*, 50*a*-50*c* and 50*a*-50*d* is 3-1, 3-0, and 0-1, respectively, and that the packets are consecutively transmitted and received through the respective channels.

If there is data transmission and reception currently made between the master 50*a* and the second slave 50*c*, the queue information search unit 51 of the master 50*a* in operation S601 searches the queue-status information from the data in the packet unit to be transmitted to the second slave 50*c*, and also searches the queue-status information from the data being received from the second slave 50*c*. In operation S603, the comparator 59 compares the counter value of the slave which corresponds to the received data, in this instance 20, with respect to the second slave 50*c*, with the maximum counter value among the data counted up to the present, that is, 50 with respect to the third slave 50*d*, and determines whether the difference between the counter values exceeds a predetermined threshold or not.

If the difference obtained is lower than the predetermined threshold, the communication priority decision unit 53 in operation S605 decides communication priority of the respective slaves 50*b*, 50*c*, 50*d* based on the queue-status information as searched. And in this case, since the number of queues of the data in the packet unit being exchanged between the first, second and third master-slave pairs 50*a*-50*b*, 50*a*-50*c*, 50*a*-50*d* is 3-1, 3-0 and 0-1, respectively, the communication priority of 1, 2 and 3 are set for the respective pairs 50*a*-50*b*, 50*a*-50*c*, 50*a*-50*d*. The communication priority is subject to change in every data transmission and reception in the packet unit. FIG. 7 illustrates one exemplary case where the communication priority changes by the data in the packet unit being consecutively transmitted and received. More specifically, FIG. 7 shows the greater number of packets in queues of the consecutively transmitted and received data in the packet unit in the order of first, second, first, third, and first master-slave pairs (50*a*-50*b*, 50*a*-50*c*, 50*a*-50*b*, 50*a*-50*d* and 50*a*-50*b*).

In operation S607, the communication initiation unit 55 determines whether the slave to which it currently intends to transmit the data has the highest priority or not. Here, with respect to the currently transmitted and received data, the second master-slave pair 50*a*-50*c* is determined as not having the highest priority.

Since the second slave 50*c* is determined as not having the highest communication priority with respect to the currently transmitted and received data, the counter 57 in operation S609 subtracts a counter increment size step of the second slave 50*c* from the counter value of the second slave 50*c*, i.e., from 20. The 'counter increment size step' of the second slave 50*c* represents the variation of the counter value which is increased as the initiation of communication with respect to the successively transmitted packets is made between the master 50a and the second slave 50c. For example, if there were 3 occurrences of consecutive communication initiation between the second master-slave pair (50a-50c) prior to the current data transmission and reception, the counter increment step size of the second slave 50c becomes '3'. Accordingly, the counter value with respect to the second slave 50c changes from '20' to '17'. In operation S611, the communication initiation unit 55 initiates communication with the slave of highest priority, i.e., with the first slave 50b. As described above, since the master is able to process starting with the data having the greater number of packets in queues in the data transmission and reception with plural slaves 50b, 50c, 50d, transmission rate in the piconet with respect to the overall system improves.

As the communication initiation unit 55 initiates communication with the slave of highest priority, i.e., with the first slave 50b, the counter 57 increases the counter value with respect to the first slave 50b by as much as '1' in operation S613. Having processed one packet as described above, the master 50a in operation S615 moves on to the next packet and processes the next packet in the same way.

If a corresponding slave with respect to the currently transmitted and received data has the highest priority, for example, if the master 50a currently transmits and receives data with respect to the first slave 50b, the communication initiation unit 55 of the master 50a in operation S619 initiates communication with the first slave 50b and processes the data transmission and reception therebetween. In this case, the counter 57 increases the counter value with respect to the first slave 50b by as much as '1' in operation S621.

Having processed data in the packet unit as described above, the master 50a in operation S615 moves on to the next packet and processes the next packet in the same way.

second slave 50c with the difference '4' between the maximum counter increment step size '7' and the counter increment step size '3' of the second slave 50c. By varying the counter value as described above when the difference between the counter increment step size of the slave corresponding to the transmitted data and the maximum counter increment step size is greater than the predetermined threshold, data transmission and reception for the data reaching a set data is prevented from being changed to the round-robin scheme.

In operation S619, the communication initiation unit 55 initiates communication with the slave corresponding to the transmitted data, i.e., with the second slave 50c. The counter 57 increases the counter value of the second slave 50c by as much as '1' in operation S621. The step of increasing counter value by as much as '1' with the counter 57 may be omitted in the case that the communication is initiated between the slave corresponding to the transmitted data and the master 50a.

The wireless communication system according to the present invention, especially a system that has a short communication range based on time division duplex (TDD) such as the Bluetooth system, reduces the wastage of communication resources and also improves the transmission rate in the communication among one master and plural slaves, because communication priority is variable depending on the number of packets in queues.

A computer simulation has been conducted on the piconet having one master and 6 slaves to examine the performance of the present invention. Data traffic is generated as shown in Table 1 below. Data traffic for the first, second, third, and fourth master-slave pairs is generated by the Markov Process (MP), while data traffic for fifth and sixth master-slave pairs is generated by two-state Markov Modulated Poisson Process (MMPP).

TABLE 1

| Process | M1 MP | S1 MP | M2 MP | S2 MP | M3 MP | S3 MP | M4 MP | S4 MP | M5 MMPP | S5 MMPP | M6 MMPP | S6 MMPP |
|---|---|---|---|---|---|---|---|---|---|---|---|---|
| Arrival rate (transition rate) | 0.2 | 0.2 | 0.19 | 0.01 | 0.01 | 0.19 | 0.01 | 0.01 | 0.19/ 0.01 (0.01) | 0.19/ 0.01 (0.01) | 0.19/ 0.01 (0.01) | 0.19/ 0.01 (0.01) |

Figure 8:
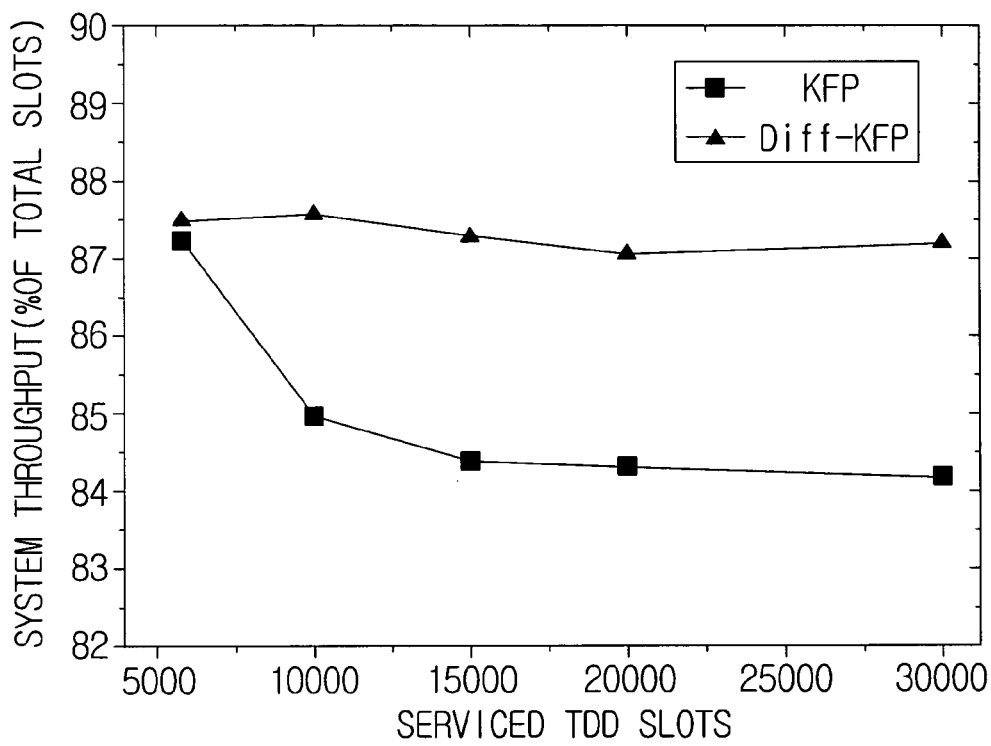
FIG. 8 is a view showing the throughput versus the number of serviced slots without SCO (synchronous connection oriented) link.
Figure 9:
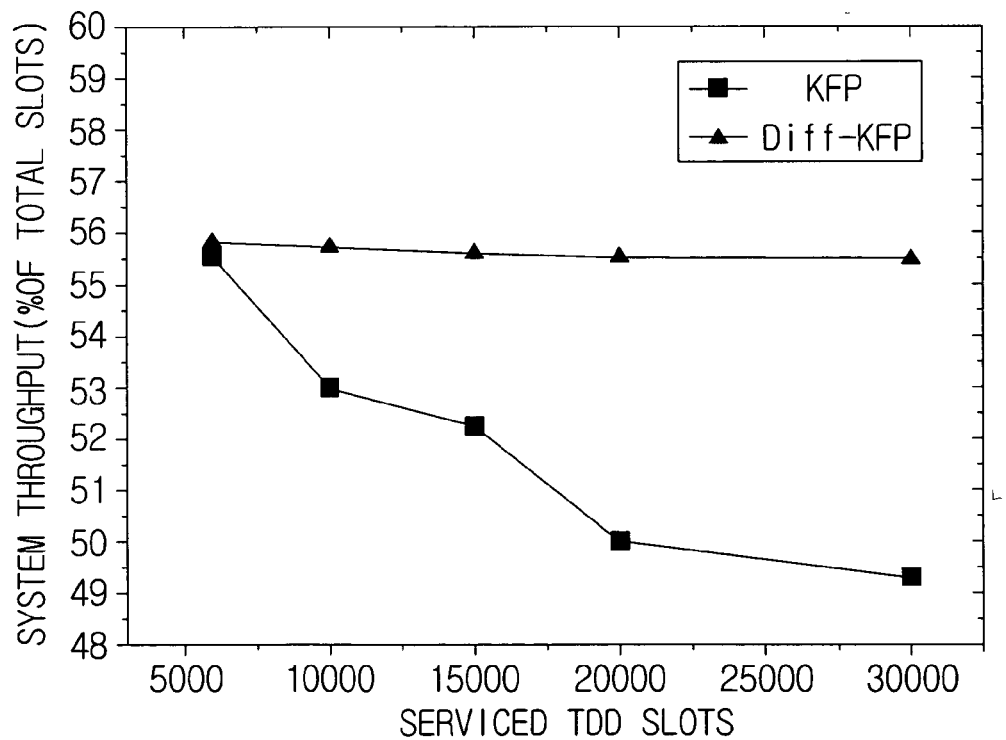
FIG. 9 is a view showing the throughput versus the number of serviced slots with SCO link.

When the difference between the counter value of the slave corresponding to the currently transmitted/received data and the maximum counter value is greater than a predetermined threshold, for example, when there is data transmission and reception going on between the second master-slave pair (50a-50c) and when the difference between the maximum counter value '50' and the counter value '20' with respect to the second slave 50c is greater than the predetermined threshold, the counter 57 in operation S617 adds the counter value '20' of the second slave 50c with the difference of the maximum counter increment step size and the counter increment step size of the second slave 50c. The 'maximum increment step size' refers to the greatest counter increment step size among the counter increment step sizes of the slaves 50b, 50c, 50d which have been increased respectively since the master 50a initiated connection with the slaves 50b, 50c, 50d through inquiry and paging processes. Assuming that the counter increment step size with respect to the first slave 50b is '2', and '3' for the second slave 50c, and '7' for the third slave 50d, for example, the counter adds the counter value '20' of the FIG. 8 is a view showing the throughput versus the number of serviced slots without SCO link, when the communication is initiated according to FIG. 6, and FIG. 9 is a view showing the throughput versus the number of serviced slots with one SCO link, when the communication is initiated according to FIG. 6. Fairness parameter K is set to 300, and the simulation was conducted with the comparison between one scheme where the queue-status based communication reaching a predetermined threshold is changed according to the round-robin scheduling (KFP) and another scheme where the queue-status based communication continues through varying a counter value when it reaches a predetermined threshold (Diff-KFP). Referring to FIGS. 8 and 9, the wireless communication method according to the present invention has almost no change in throughput even when the difference between the maximum counter value and the counter value of the slave corresponding to the transmitted data reaches a predetermined threshold.

Figure 10:
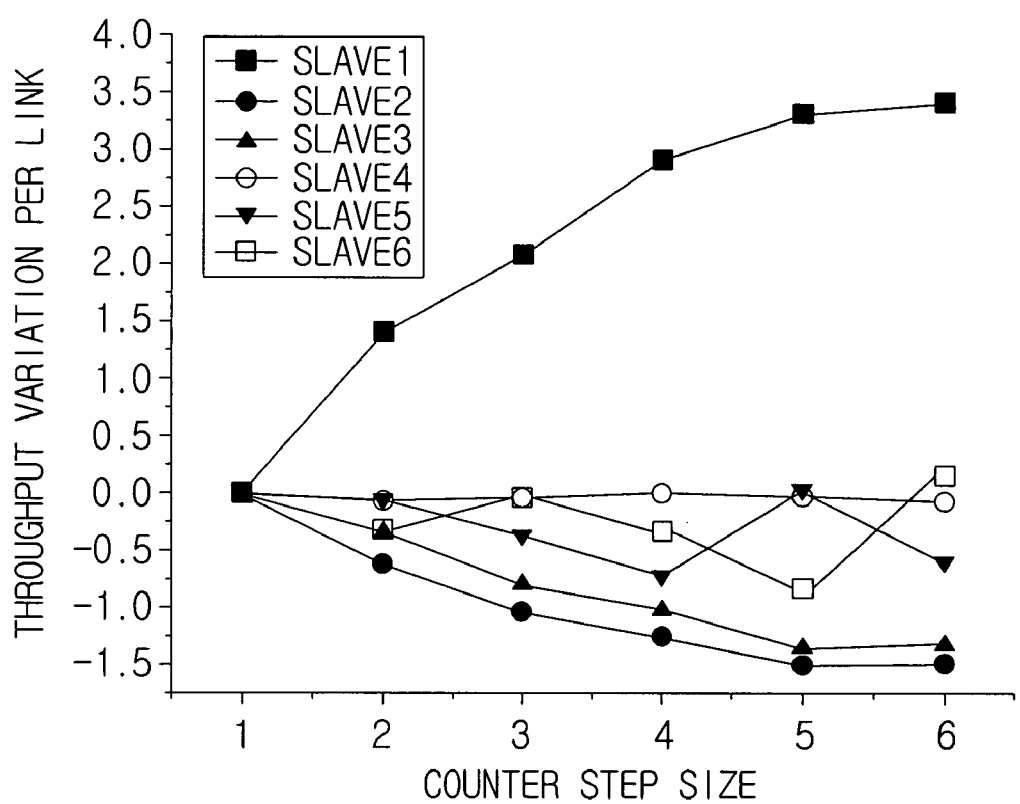
FIG. 10 is a view showing the throughput per link versus counter increment step size of FIG. 6.

FIG. 10 is a view showing the throughput variation per link versus counter increment step size that is varied as in FIG. 6. More specifically, the throughputs of the master-slave pairs are compared with each other, while varying the counter value of the master-slave1 pair and fixing the counter value of other master-slave pairs.

Referring to FIG. 10, as the counter step size of the master-slave1 pair increases, the throughput also becomes higher. Accordingly, it is confirmed that various demands of QoS are satisfied by adjusting the counter increment step size.

The wireless communication system according to the present invention can guarantee both high throughput and high fairness when one wireless communication device transmits and receives data with respect to plural wireless communication devices.

Although a few preferred embodiments of the present invention has been described, it will be understood by those skilled in the art that the present invention should not be limited to the described preferred embodiments, but various changes and modifications can be made within the spirit and scope of the present invention as defined by the appended claims.

What is claimed is:

1. A wireless communication system, comprising:
   a queue information search unit for searching a queue-status information provided to a data in a packet unit;
   a communication priority decision unit for deciding a communication priority of a plurality of external devices based on the queue-status information as searched, giving a higher priority to an external device having a greatest number of packets in queues;
   a communication initiation unit for initiating a communication with the plurality of external devices according to the communication priority as decided;
   a counter for counting a number of times that the communication is initiated for each of the plurality of external devices; and
   a comparator for comparing a first counter value of a first external device that corresponds to a transmitted data with a second counter value of a second external device that has a maximum counter value, wherein
   when a counter value difference between the first external device and the second external device is smaller than a predetermined threshold, the communication initiation unit initiates communication with the third external device which has a highest communication priority.

2. The wireless communication system of claim 1, wherein, when the first external device has a first communication priority other than the highest communication priority, the counter subtracts a counter increment step size of the first external device from the first counter value.

3. The wireless communication system of claim 2, wherein the counter increases a third counter value of the third external device having the highest communication priority by as much as '1'.

4. The wireless communication system of claim 1, wherein, when the first external device has the highest communication priority, the communication initiation unit initiates communication with the first external device.

5. The wireless communication system of claim 4, wherein the counter increases the first counter value by as much as '1'.

6. A wireless communication system, comprising:
   a queue information search unit for searching a queue-status information provided to a data in a packet unit;
   a communication priority decision unit for deciding a communication priority of a plurality of external devices based on the queue-status information as searched, giving a higher priority to an external device having a greatest number of packets in queues;
   a communication initiation unit for initiating a communication with the plurality of external devices according to the communication priority as decided;
   a counter for counting a number of times that the communication is initiated for each of the plurality of external devices; and
   a comparator for comparing a first counter value of a first external device corresponding to a transmitted data with a second counter value of a second external device having a maximum counter value, wherein
   when a difference between the first counter value and the second counter value is greater than a predetermined threshold, the communication initiation unit initiates communication with the first external device.

7. The wireless communication system of claim 6, wherein the counter adds the first counter value with a difference between a maximum counter increment step size and a counter increment step size of the first external device, the maximum counter increment step size being a greatest counter increment step size of the plurality of external devices.

8. A wireless communication method comprising the steps of:
   searching a queue-status information provided in a data in a packet unit;
   deciding a communication priority of a plurality of external devices based on the queue-status information as searched, giving a higher priority to an external device of the plurality of external devices having a greatest number of packets in queues;
   initiating communication with the plurality of external devices according to the communication priority as decided;
   counting a number of times that communication is initiated for each of the plurality of external devices; and
   comparing a first counter value of a first external device that corresponds to a transmitted data with a second counter value of a second external device that has a maximum counter value, wherein
   when a counter value difference between the first external device and the second external device is smaller than a predetermined threshold, the communication initiation step initiates communication with a third external device which has a highest communication priority.

9. The wireless communication method of claim 8, wherein, when the first external device has a first communication priority other than the highest priority, a counting step subtracts a counter increment step size of the first external device from the first counter value of the first external device.

10. The wireless communication method of claim 9, wherein the counting step increases a third counter value of the third external device having the highest communication priority by as much as '1'.

11. The wireless communication method of claim 8, wherein, when the third external device does not have the highest communication priority and the first external device has the highest communication priority, the communication initialization step initiates communication with the first external device.

12. The wireless communication method of claim 11, wherein the counting step increases the first counter value by as much as '1'.

13. A wireless communication method comprising the steps of:

searching a queue-status information provided in a data in a packet unit;

deciding a communication priority of a plurality of external devices based on the queue-status information as searched, giving a higher priority to an external device of the plurality of external devices having a greatest number of packets in queues;

initiating communication with the plurality of external devices according to the communication priority as decided;

counting a number of times that communication is initiated for each of the plurality of external devices; and comparing a first counter value of the first external device corresponding to a transmitted data and the second counter value of the second external device having the maximum counter value, wherein when a counter value difference between the first external device and the second external device is greater than a predetermined threshold, the communication initialization step initiates communication with the first external device.

14. The wireless communication method of claim 13, wherein the counting step adds the first counter value with a difference between a maximum counter increment step size and a counter increment step size of the first external device, the maximum counter increment step size being a greatest counter increment step size of the plurality of external devices.

* * * * *